United States Patent
Mizumaki

(10) Patent No.: US 7,133,787 B2
(45) Date of Patent: Nov. 7, 2006

(54) METHOD OF MANAGING ELECTRIC POWER GENERATOR, MANAGING DEVICE, ELECTRIC POWER GENERATOR, COMMUNICATIONS DEVICE, COMPUTER PROGRAM THEREFOR, AND MANAGING SYSTEM FOR ELECTRIC POWER GENERATOR

(75) Inventor: Hidetaka Mizumaki, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 109 days.

(21) Appl. No.: 10/777,983

(22) Filed: Feb. 13, 2004

(65) Prior Publication Data
US 2004/0167676 A1    Aug. 26, 2004

(30) Foreign Application Priority Data
Feb. 26, 2003    (JP) .............................. 2003-049809

(51) Int. Cl.
*G01R 21/00*    (2006.01)
(52) U.S. Cl. ..................................... 702/62; 340/870.03
(58) Field of Classification Search ................. 702/60, 702/62; 340/870.03; 363/102; 700/295
See application file for complete search history.

(56) References Cited

U.S. PATENT DOCUMENTS

| | | | |
|---|---|---|---|
| 4,700,188 A * | 10/1987 | James | 340/870.03 |
| 6,425,038 B1 * | 7/2002 | Sprecher | 710/269 |
| 2002/0033020 A1 * | 3/2002 | Tonomura et al. | 60/641.8 |
| 2003/0004659 A1 * | 1/2003 | Hayashi et al. | 702/60 |

FOREIGN PATENT DOCUMENTS

JP    2002-289883    10/2002

* cited by examiner

*Primary Examiner*—Bryan Bui
*Assistant Examiner*—Xiuqin Sun
(74) *Attorney, Agent, or Firm*—Harness, Dickey & Pierce, P.L.C.

(57) ABSTRACT

A communications processing section in a managing device transmits a request for a transmission of generated power quantity information via the Internet to an electric power generator to be managed. A database manager in the managing device stores the generated power quantity information transmitted back from the electric power generator into a database. A timing controller in the managing device controls so that the number of electric power generators to which a transmission request is being transmitted does not exceed a predetermined value.

21 Claims, 6 Drawing Sheets

FIG. 2

| HEADER | ADDRESS | ID INFO. | WEATHER INFO. | LOCATION INFO. | GENERATED POWER QTY. INFO. | FOOTER |

FIG. 4

| HEADER | ADDRESS INFO. | CONTROL INFO. | FOOTER |

METHOD OF MANAGING ELECTRIC POWER GENERATOR, MANAGING DEVICE, ELECTRIC POWER GENERATOR, COMMUNICATIONS DEVICE, COMPUTER PROGRAM THEREFOR, AND MANAGING SYSTEM FOR ELECTRIC POWER GENERATOR

This Nonprovisional application claims priority under 35 U.S.C. § 119(a) on Patent Application No. 2003-49809 filed in Japan on Feb. 26, 2003, the entire contents of which are hereby incorporated by reference.

FIELD OF THE INVENTION

The present invention relates to a method of managing electric power generators, a managing device, an electric power generator, a communications device, a computer program therefor, and a system for managing electric power generators, each intended for an Internet-based management of information on the quantity of electric power generated by the generator.

BACKGROUND OF THE INVENTION

Recent years have seen increasing numbers of households equipped with solar cells or like electric power generators for environmental and long-term economic reasons. The electric power generated by the generator is transmitted to an electric power company to cancel out the power consumed by the household. Two watt-hour meters are often used, one to measure the power consumption by the household and another to measure the power generated by the generator installed in the household. Most electric power generators are expensive and difficult for a household to pay off the cost unless it is used for a long time.

If the generator breaks down, and it is not found quickly, the generator stops operation during that period, failing to generate power which could be bought by the electric power company. The breakdown of the generator is not the only problem; an extra time is required to repay the cost of the expensive generator. Resultant financial loss may be serious.

To monitor the generator for a breakdown, published unexamined patent application 2002-289883 (Tokukai 2002-289883; published on Oct. 4, 2002) among others proposes a solar panel diagnostic system where panel-type power generating facilities are connected to the Internet, and a weather data server is connected to a diagnostic server which is determining means in the system.

The diagnostic server collects data on the quantity of power generated and transmitted from each panel-type power generating facility on a daily basis. The server also collects weather data from the weather data server. The diagnostic server monitors the solar panels in the panel-type power generating facilities by means of the collected power generation and weather data. Any abnormality detected is reported via the Internet to the home gateway for the panel-type power generating facility.

SUMMARY OF THE INVENTION

In this conventional arrangement, each panel-type power generating facility transmits data on the quantity of generated power of its own accord. If there are too many panel-type power generating facilities, the workload may consume a considerable part of the capacity of the managing device (diagnostic server).

The present invention has an objective to offer a method of managing electric power generators, a managing device, an electric power generator, a communications device, a computer program therefor, and a system for managing electric power generators, which are capable of managing generated power quantity information for the electric power generator without placing too heavy workloads on the managing device.

To achieve the objective, a method of managing electric power generators in accordance with the present invention includes:

the request step of a managing device transmitting, via the Internet to either an electric power generator to be managed or an electric-power-generator-end communications device connected to an electric power generator to be managed, a request for a transmission of generated power quantity information for the electric power generator;

the reply step of either the electric power generator or the communications device transmitting the generated power quantity information indicating a generated power quantity for the electric power generator back to the managing device in response to the request;

the storage step of the managing device storing the generated power quantity information into a database in association with the electric power generator which transmitted back the generated power quantity information or the electric power generator to which is connected the communications device which transmitted back the generated power quantity information; and the decision step of the managing device deciding a timing to transmit a request for a transmission of generated power quantity information for the electric power generators.

According to the arrangement, in the reply step, the generated power quantity information for the electric power generator is transmitted to the managing device over the Internet. Thus, if the electric power generators or the communications equipment is capable of communicating with the managing device over the Internet, the managing device can store the generated power quantity information for the electric power generators into a database wherever the electric power generators are located. Therefore, the managing device or the user of the managing device can determine from the generated power quantity information stored in the database whether any one of the electric power generators is broken or suffering a reduction in power generation capability. An action can be taken more quickly than in a case where the breakdown and other trouble of the electric power generator is not dealt with until the user of the electric power generator reports the trouble.

Further, the generated power quantity information for the electric power generators is transmitted in response to a request for a transmission from the managing device, and the managing device decides timings of the transmissions of requests for transmissions of the generated power quantity information from the electric power generators; therefore, the managing device can control on its own the peak data quantity of the generated power quantity information it receives. Therefore, the managing device is capable of collectively managing the generated power quantity information for the electric power generators, and still restrains the data peak quantity in comparison with a case where the electric power generators transmit generated power quantity information at timings determined on their own. Consequently, the generated power quantity information for the generators can be collectively managed without placing too heavy workloads on the managing device. This reduces the workload on hardware resources of the managing device and enables the system for managing electric power generators to be constructed at a reduced cost.

The managing device may set the transmission timings for the convenience of the managing device itself. The managing device may transmit transmission requests to target electric power generators when its management capacity is not fully used for the other purposes. In addition, the managing device can freely select the electric power generator to be managed through the transmission or no transmission of a transmission request. Therefore, management targets can be changed in accordance with a time zone (e.g., daytime or nighttime) by the managing device learning of the identification information for the electric power generators to be managed and identifying the management targets for any particular time period with reference to the identification information. As discussed in the foregoing, a greater number of electric power generators can be managed at once by the managing device changing target electric power generators for management in accordance with a time zone and other conditions.

A managing device in accordance with the present invention, to achieve the objective, includes:

transmission request means for transmitting, via the Internet to either an electric power generator to be managed or an electric-power-generator-end communications device connected to an electric power generator to be managed, a request for a transmission of generated power quantity information for the electric power generator;

registering means for registering the generated power quantity information into a database in association with the electric power generator or the communications device upon transmitting the generated power quantity information back from the electric power generator or the communications device; and timing decision means for deciding a timing for the transmission request means to transmit the request.

According to the arrangement, the transmission request means transmits a request for a transmission of generated power quantity information to the communications device or the electric power generator at a transmission timing decided by the timing decision means. The registering means associates the generated power quantity information transmitted back from the communications device or electric power generator to the communications device or electric power generator, and registers the generated power quantity information into a database in association with that communications device or electric power generator. Therefore, the managing device is capable of controlling the peak data quantity of the generated power quantity information it receives. Thus, the managing device is capable of collectively managing the generated power quantity information for the electric power generators, and still restrains the data peak quantity in comparison with a case where the electric power generators transmit generated power quantity information at timings determined on their own. Consequently, the generated power quantity information for the generators can be collectively managed without placing too heavy workloads on the managing device. This reduces the workload on hardware resources of the managing device and enables the system for managing electric power generators to be constructed at a reduced cost.

To achieve the objective, An electric power generator in accordance with the present invention, as in the foregoing, includes:

receiving means for receiving a request for a transmission addressed to the electric power generator via the Internet from a managing device having timing decision means for deciding timings to transmit a request for a transmission of generated power quantity information for the electric power generators to be managed; and reply means for transmitting generated power quantity information indicating a generated power quantity for the electric power generator back to the managing device in response to the request.

Meanwhile, a communications device in accordance with the present invention, as in the foregoing, is a communications device connectable to an electric power generator, and includes:

receiving means for receiving a request for a transmission addressed to the communications device via the Internet from a managing device having timing decision means for deciding timings to transmit a request for a transmission of generated power quantity information for electric power generators to be managed; and reply means for transmitting generated power quantity information indicating a generated power quantity for the electric power generator connected to the communications device back to the managing device in response to the request.

According to these arrangements, the generated power quantity information for the electric power generators is again transmitted in response to a request for a transmission from the managing device, similarly to the foregoing method of managing electric power generators. Besides, the managing device decides the timing to transmit a request for a transmission of generated power quantity information for the electric power generators; therefore, the managing device is capable of controlling the peak data quantity of the generated power quantity information it receives. Thus, the managing device is capable of collectively managing the generated power quantity information for the electric power generators, and still restrains the data peak quantity in comparison with a case where the electric power generators transmit generated power quantity information at timings determined on their own. Consequently, the managing device can collectively manage the generated power quantity information for the electric power generators without experiencing too heavy workloads, enabling the user of the managing device to more quickly deal with a breakdown and other trouble.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 2 is a drawing showing a data structure of management information transmitted by the electric power generator.

FIG. 4 is a drawing showing a data structure of a transmission request sent from a managing device in the managing system.

DESCRIPTION OF THE EMBODIMENTS

[Embodiment 1]

Figure 1:
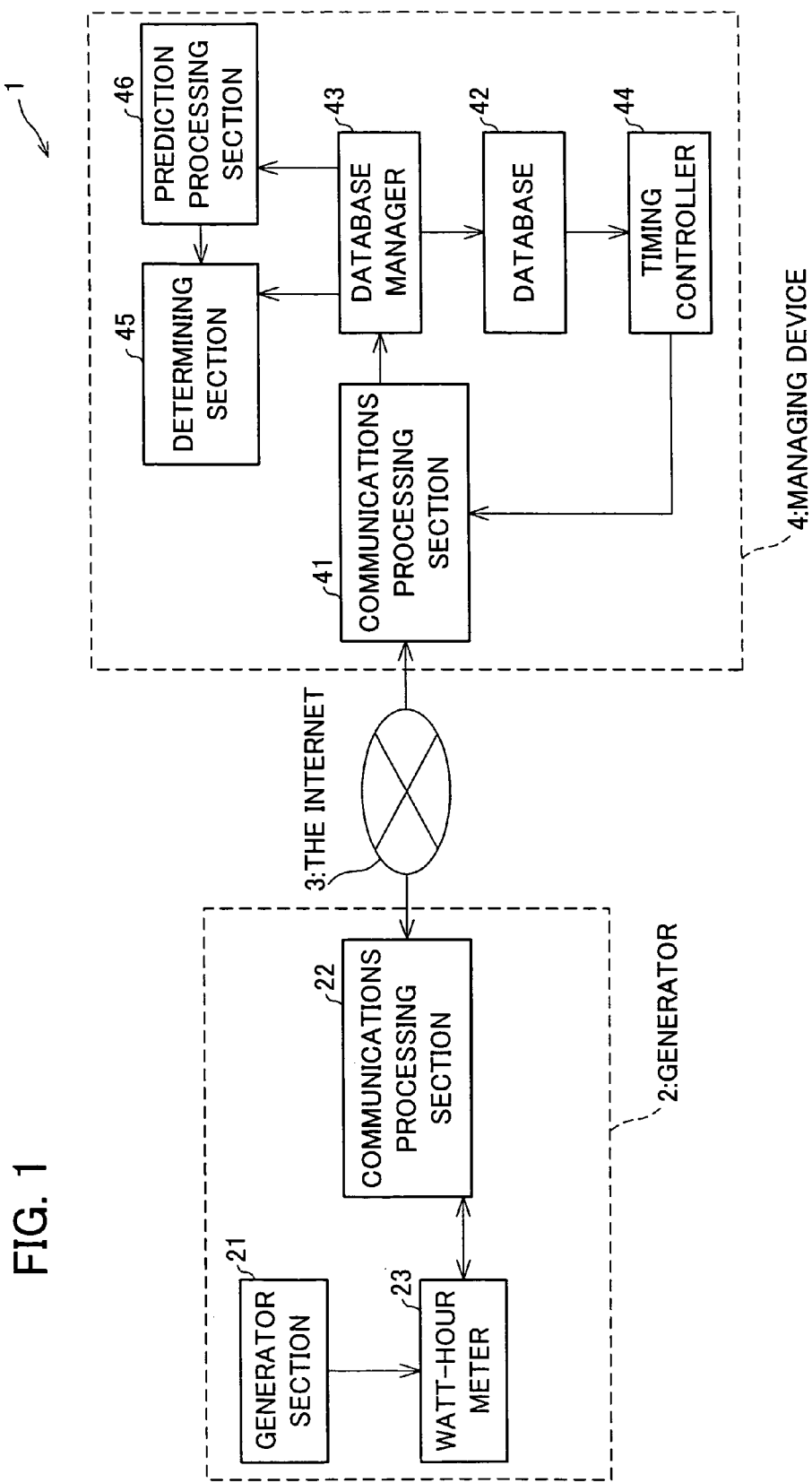
FIG. 1, illustrating an embodiment of the present invention, is a block diagram showing major features of a system for managing electric power generators.

The following will describe an embodiment of the present invention in reference to FIG. 1 through FIG. 5. A managing system 1 in accordance with the present embodiment is a system capable of collectively managing generated power quantity information for electric power generators at distant places without placing too heavy workloads on a managing device. Referring to FIG. 1, the system 1 is made up of generators 2, or the management targets, and a managing device 4, connected to the generators 2 via the Internet 3, which manages the generated power quantity information for the generators 2.

The generator 2 in accordance with the present embodiment includes a generator section 21, a communications processing section (receiving means, reply means) 22 for connecting to the Internet 3, and a watt-hour meter 23 measuring the quantity of electric power generated by the generator section 21 (generated power quantity). In response to a request from the managing device 4, the communications processing section 22 generates management information, inclusive of the generated power quantity as measured by the watt-hour meter 23, for transmission to the managing device 4.

The generator 2 in accordance with the present embodiment is a solar cell. The generator section 21 is a solar cell module transducing sunlight to electrical energy. A typical solar cell as the generator 2 installed in a household includes a set of solar cell modules. Likewise, the generator section 21 is arranged from a set of solar cell modules in the present embodiment. Further, the watt-hour meter 23 is able to measure the generated power quantities for individual modules. The communications processing section 22 is able to generate management information, inclusive of generated power quantity information for each module.

Now referring to FIG. 2, the management information in accordance with the present embodiment is made up of: for example, a header indicating the beginning of the management information; an address indicating the position of the managing device 4 which is a destination; identification information by which a generator 2, or an information source, is identified; location information indicating the location of the generator 2; weather information at that location; generated power quantity information indicating the generated power quantity as measured by the watt-hour meter 23; and a footer indicating the end of the management information.

In the present embodiment, the identification information is, but not limited to, a manufacturer code indicating the manufacture of the generator 2, a model code indicating the model of the generator 2, and a serial code indicating the serial number of the generator 2. The manufacturer code is preferably in accordance with an industry standard by which multiple manufactures can be individually identified when such a standard exists; otherwise, the code may be given in the form of, for example, the ASCII code or another character code provided that the code enables the identifying of the manufactures.

The identification information may be stored in a memory (not shown) in the generator 2. When this is the case, the communications processing section 22, in response to a request for a transmission of generated power quantity information from the managing device 4, refers to the memory for identification information and generates management information by adding a header and a footer to the identification information and a measurement output from the watt-hour meter 23. Each generator 2 may have a computer program which, with identification information entered as preset data, functions as the communications processing section 22, so that the communications processing section 22 for the generator 2 can generate management information including identification information and a result of measurement for that generator 2.

The location information indicates the location of the generator 2. Referring to the location information, the managing device 4 can select from a set of generators 2 managed by the device 4 those generators 2 which are located at nearby places with a somewhat close correlation in daylight hours. The location information is given in the form of, for example, the address of the location of the generator 2.

Indicating the daylight hours for the generator section 21, the weather information is given in the form of, for example, the daylight hours or weather (sunny, cloudy, rainy, etc.) as detected by a sensor (not shown) equipped to the generator 2.

In the foregoing, the watt-hour meter 23 in accordance with the present embodiment was presumed to continuously measure the electric power generated through transduction by the generator section 21 and generate management information from a result of measurement given by the watt-hour meter 23 when the communications processing section 22 generates management information. This is however by no means limiting the way in which the management information is generated; any method can be employed provided that the generated management information includes the generated power quantity for the generator section 21. For example, the watt-hour meter 23 measures the generated power quantity for the generator section 21 at a predetermined timing and records it in a memory (not shown) so that the communications processing section 22 can retrieve the record on the generated power quantity from the memory to generate management information including generated power quantity information.

The generator 2 may connect to the Internet 3 via, for example, a dedicated or other type of communication line. In the present embodiment, however, a power line is used through which the generator 2 transmits the generated power to an electric power company, because the power line is a suitable medium through which the generator 2 connects to the Internet 3. This enables the generator 2 to connect to the Internet 3 without a user of the generator 2 having to establish a separate connection to a communication line. The generator 2 can therefore connect to the Internet 3 without the user actively knowing the communication line. Also, the managing device 4 can manage each and every one of the generators 2 it is supposed to manage.

Figure 3:
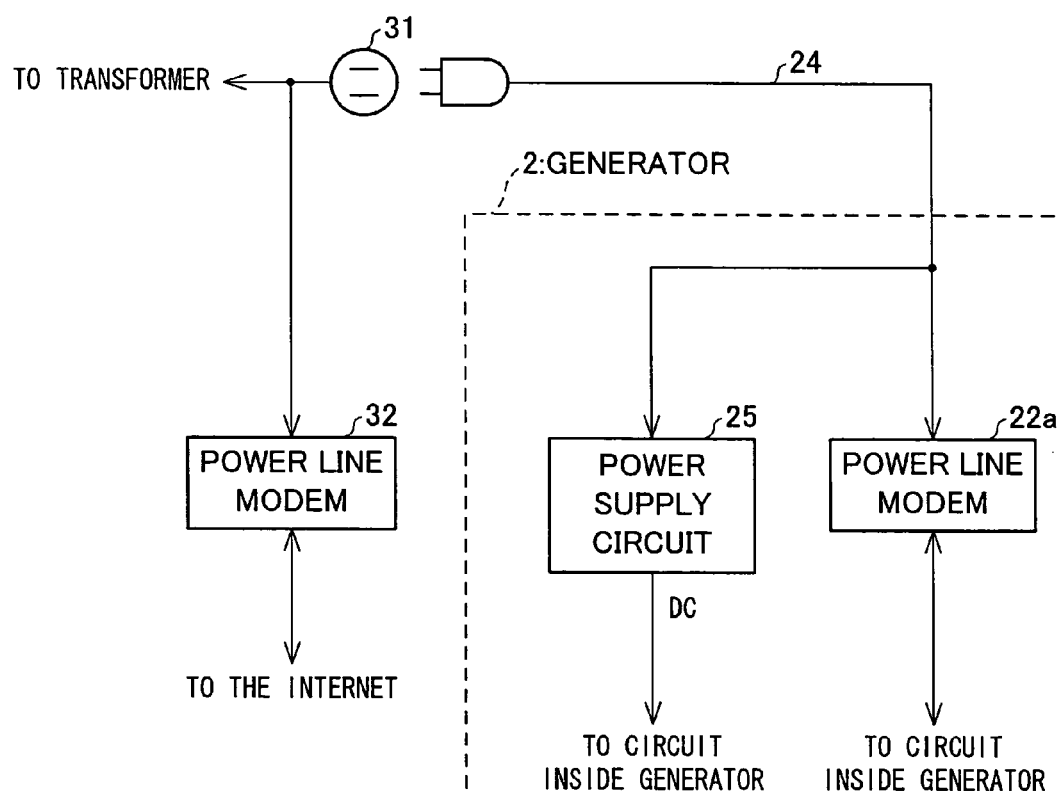
FIG. 3 is a block diagram showing how the electric power generator is connected to the Internet.

More specifically, the communications processing section 22 in accordance with the present embodiment is realized as a power line modem 22a as shown in FIG. 3. Operating as a slave device, the power line modem 22a is capable of transmitting and receiving data to a power line modem 32 which is the master device via a power line 24 and power socket 31 through which the power generated by the generator 2 is transmitted to the electric power company. The power socket 31 and power line modem 22a are installed in a house or the like where the generator 2 is located. The power line modem 32, or master device, is connected to the Internet 3 in order to relay the communications between the power line modem 22*a* (communications processing section 22) for the generator 2 and the Internet 3.

The power supply circuit 25 for the generator 2 is connected to power supply equipment, such as a transformer (not shown), which is a part of a power supply infrastructure via the power line 24 and power socket 31 in order to supply power to the power supply equipment. In the present embodiment, the figure shows the power socket 31. However, the power line 24 and the power supply equipment may be directly connected without the power socket 31. The power supply circuit 25 feeds the electric power generated by the generator section 21 in the generator 2 to the power supply equipment after, for example, converting it between AC/DC, varying the output voltage, and/or otherwise converting it to a suitable form to the power supply equipment.

Now referring back to FIG. 1, the managing device 4 includes: a communications processing section (transmission request means) 41 connecting to the Internet 3; a database 42 storing generated power quantity information in combination with weather information and location information as a time series for each generator 2 managed by the managing device 4; a database manager (registering means) 43 updating the records on the generator 2 in the database 42 on the basis of the generated power quantity information transmitted from the generator 2; a timing controller (timing decision means) 44 controlling the timing at which the communications processing section 41 requests to the generators 2 a transmission of the generated power quantity information; and a determining section 45 determining whether each generator 2 is broken or otherwise suffering a reduction in power generation capability from the generated power quantity information for the generator 2 retrieved in an access to the database 42 via the database manager 43.

The determining section 45 monitors a change of the generated power quantity information for the generators 2 so as to determine if any of the generators 2 are broken or otherwise suffering a reduction in power generation capability, according to, for example, whether or not the generated power quantity information is below a predetermined threshold value or whether or not the reduction ratio of the generated power quantity information is above a predetermined threshold value.

In making the determination, the determining section 45 in accordance with the present embodiment uses not only the generated power quantity information, but also by referring to the location information for the generators 2 in the database 42 and comparing sets of the generated power quantity information with the same geographical conditions for higher precision and accuracy.

Specifically, the determining section 45 refers to the location information for the generators 2 in the database 42 and selects those generators 2 which are located at nearby places having a somewhat close correlation in daylight hours. The determining section 45 then retrieves generated power quantity information for the selected generators 2 from the database 42 for comparison. The section 45 searches the selected sets of generated power quantity information for a set of which the quantity is remarkably small, for example, a set of which the reduction ratio from a mean or mean square value exceeds a predetermined threshold value. If such a set is found, the section 45 determines that the generator 2 from which that set of generated power quantity information has been transmitted is broken or otherwise suffering a reduction in power generation capability.

Since the generator section 21 in accordance with the present embodiment is a solar cell, the generated power quantity changes according to the intensity of sunlight. Therefore, those generators 2 located closely show similar changes in generated power quantity.

As mentioned in the foregoing, the determining section 45 in accordance with the present embodiment divides the generators 2 into groups depending on their locations. The section 45 compares the generators 2 of the same group in terms of their generated power quantity information to determine whether any of the generators 2 are broken or otherwise suffering a reduction in power generation capability.

Therefore, from the generators 2 generating a reduced quantity of power, can be excluded those of the same group which are showing similar changes in generated power quantity, in other words, those generating a reduced quantity of power presumably due to poor weather, not because they are broken or otherwise suffering a reduction in power generation capability. Consequently, the determining section 45 can identify more accurately those generators 2 suspected of a breakdown or a reduction in power generation capability.

The managing device 4 in accordance with the present embodiment is provided with a prediction processing section 46 predicting the generated power quantity for a generator 2 under the weather conditions as indicated by the weather information for the location of the generator 2 retrieved from the database 42. The determining section 45 compares the generated power quantity information as predicted by the prediction processing section 46 to the actual generated power quantity information stored in the database 42 in association with the weather information to determine whether the generator 2 is broken or otherwise suffering a reduction in power generation capability.

Specifically, when the generator 2 is operating normally, its power generation efficiency is dictated by the structure and material of the generator section 21. The generated power quantity in normal operation is determined in advance under various weather conditions. Therefore, the prediction processing section 46 is capable of predicting the generated power quantity for the generator 2 under the weather conditions as indicated by weather information by, for example, storing combinations of weather conditions and generated power quantities in advance and retrieving the generated power quantity corresponding to the weather information obtained from the database 42. Note that in the foregoing, the prediction processing section 46 was presumed to store the combinations. Alternatively, if the prediction processing section 46 is capable of outputting a generated power quantity corresponding to the weather information retrieved from the database 42, the prediction processing section 46 may in advance store a function with which a generated power quantity is calculated from weather conditions, instead of the combinations, to calculate a generated power quantity using the function.

The determining section 45 compares the generated power quantity for each generator 2 as predicted by the prediction processing section 46 (predicted value) to the generated power quantity as indicated by the generated power quantity information retrieved from the database 42 (measured value) to determine that the generator 2 is broken or otherwise suffering a reduction in power generation capability if for example, the reduction ratio of the measured value from the predicted value exceeds a predetermined threshold value (for example, 20%).

As discussed in the foregoing, the determining section 45, in addition to the aforementioned determining methods, compares the predicted value for the generated power quantity for the generator 2 under the weather conditions indicated by the weather information to the measured value for the generated power quantity as stored in the database 42 in association with the weather information to determine whether the generator 2 is broken or otherwise suffering a reduction in power generation capability. Therefore, from the generators 2 generating a reduced quantity of power, can be excluded those of the same group which are showing similar changes in generated power quantity, in other words, those generating a reduced of quantity of power presumably due to poor weather, not because they are broken or otherwise suffering a reduction in power generation capability. Consequently, the determining section 45 can identify more accurately those generators 2 suspected of a breakdown or a reduction in power generation capability.

The timing controller 44 controls so that the number of generators 2 to which the communications processing section 41 is transmitting a transmission request does not exceed a predetermined value, by, for example, transmitting a request for a transmission of generated power quantity information to a predetermined number of generator groups 2 and waiting for a predetermined period of time before transmitting another request for a transmission of generated power quantity information to next generator groups 2.

The timing controller 44 may monitor the workload for the managing device 4. If the workload exceeds a predetermined value, the transmission of a request for a transmission of generated power quantity information may be delayed. Further, in addition to or instead of the workload monitoring, the request for a transmission of generated power quantity information may be transmitted avoiding the time period specified in advance as experiencing heavy workloads.

Note however that once having transmitted a transmission request to a generator 2, the managing device 4 cannot receive management information including generated power quantity information from the generator 2 until transmitting a next transmission request to the generator 2; therefore, the managing device 4 cannot learn of any reductions of the generated power quantity due to a breakdown of the generator 2. Therefore, if the managing device 4 is expected to learn of a breakdown of a generator 2 before the user of the generator 2 reports the breakdown, the timing controller 44 preferably controls the length of that period so that it does not exceed a mean or expected value of the time taken by the user of the generator 2 to report a breakdown of the generator 2 after the occurrence of the breakdown.

The timing controller 44 may transmit a transmission request more frequently to a generator 2 determined by the determining section 45 as relatively likely to develop a breakdown and other trouble than to a generator 2 determined as relatively unlikely to develop a breakdown. Thus, the managing device 4 can obtain generated power quantity information more frequently from a generator 2 suspected of a breakdown and other trouble so that it can more accurately determine whether any of the generators 2 is broken or experiencing any other trouble. The increased frequency of obtaining generated power quantity information contributes to the discovery of a breakdown and like causes.

The database 42 stores a record for each generator 2 to be managed. The record includes a history of generated power quantity information for the associated generator 2 and an access method to the generator 2 (for example, the address of the generator 2) so that the communications processing section 41 can access the generators 2 by referring to the database 42.

Figure 4:
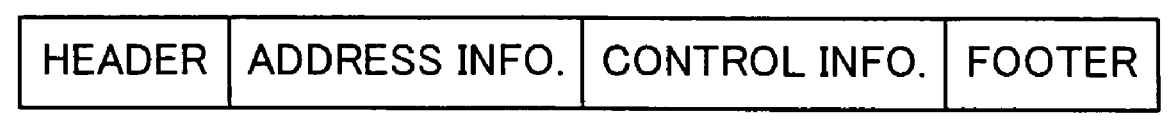

As shown in FIG. 4, the transmission request is made up of: for example, a header indicating the beginning of the transmission request for generated power quantity information; the address of the generator 2 to which the request is to be transmitted; control information according to which a request is made to the generator 2 for a transmission of generated power quantity information; and a footer indicating the end of the transmission request. The control information in accordance with the present embodiment includes the address of the managing device 4 on the transmission end. Based on the address, the communications processing section 22 in the generator 2 can learn of the address to which the generated power quantity information is to be sent back.

Members constituting the managing device 4 and the generator 2 may be function blocks realized by a CPU or like computing means executing a computer program recorded in a memory medium, such as a ROM or RAM. Alternatively, they can be realized by hardware implementing an equivalent process. A further alternative is a combination of hardware and computing means with the hardware implementing part of the process and the computing means executing the control of the hardware and the rest of the process by running a computer program.

If the members are realized by a general-purpose personal computer running a generator-managing computer program, which is the case of the managing device 4 in accordance with the present embodiment, the general-purpose personal computer can serve as the managing device 4 in accordance with the present embodiment merely by running a computer program The computing means may be a single physical entity or made up of two or more physical entities interconnected via internal buses and various communications paths to co-execute a computer program. The computer program may be distributed on storage media in the form of the computer program per se or computer program data representing data based on which the computer program is constructed. The computer program data may also be distributed over wired or wireless communications means for execution in the computing means.

Although the storage medium used to distribute computer program data is preferably removable, the storage medium is not necessarily removable after the distribution of the computer program data. The storage medium may be rewriteable or non-rewriteable, as well as volatile or non-volatile, and of any type of recording method and shape, provided the medium can carry the computer program data. Some examples of the storage media include tape media, such as magnetic tape and cassette tape; magnetic disks, such as floppy (registered trademark) disks and hard disks; and other disks, such as CD-ROMs, magneto-optical disks (MOs), mini disks (MDs), and digital video disks (DVDs). Further, the storage medium may be a card, such as an IC card or optical card; or a semiconductor memory, such as a mask ROM, EPROM, EEPROM, or flash ROM.

The computer program data may be instruction code for the computing means covering the whole process. If there already exists a basic computer program, such as an operating system or library, that can be recalled by a predetermined procedure to execute part or the entirety of the process, the process may be partly or entirely replaced with code, pointer, or the like by means which an instruction is made for the computing means to recall the basic computer program.

The computer program data may be stored on the storage medium in, for example, such format that the computing means can access and execute the program as is the case with actual loaded memory, storage format after installation in a local storage medium (for example, actual memory disk, etc.) and before loading into actual memory that the computing means can always make access, or store format before installation in a local storage medium over a network or transportable storage medium. In addition, the computer program data is not limited to compiled object code. The data may be source code or intermediate code created during the course of interpretation or compilation. In any of these cases, similar effects are achieved regardless of the storage format in which the computer program data is stored in the storage medium, provided that the data can be converted into an executable format for the computing means by, for example, decompression, decoding, interpretation, compilation, linking, loading into actual memory, or any combination of these processes.

Figure 5:
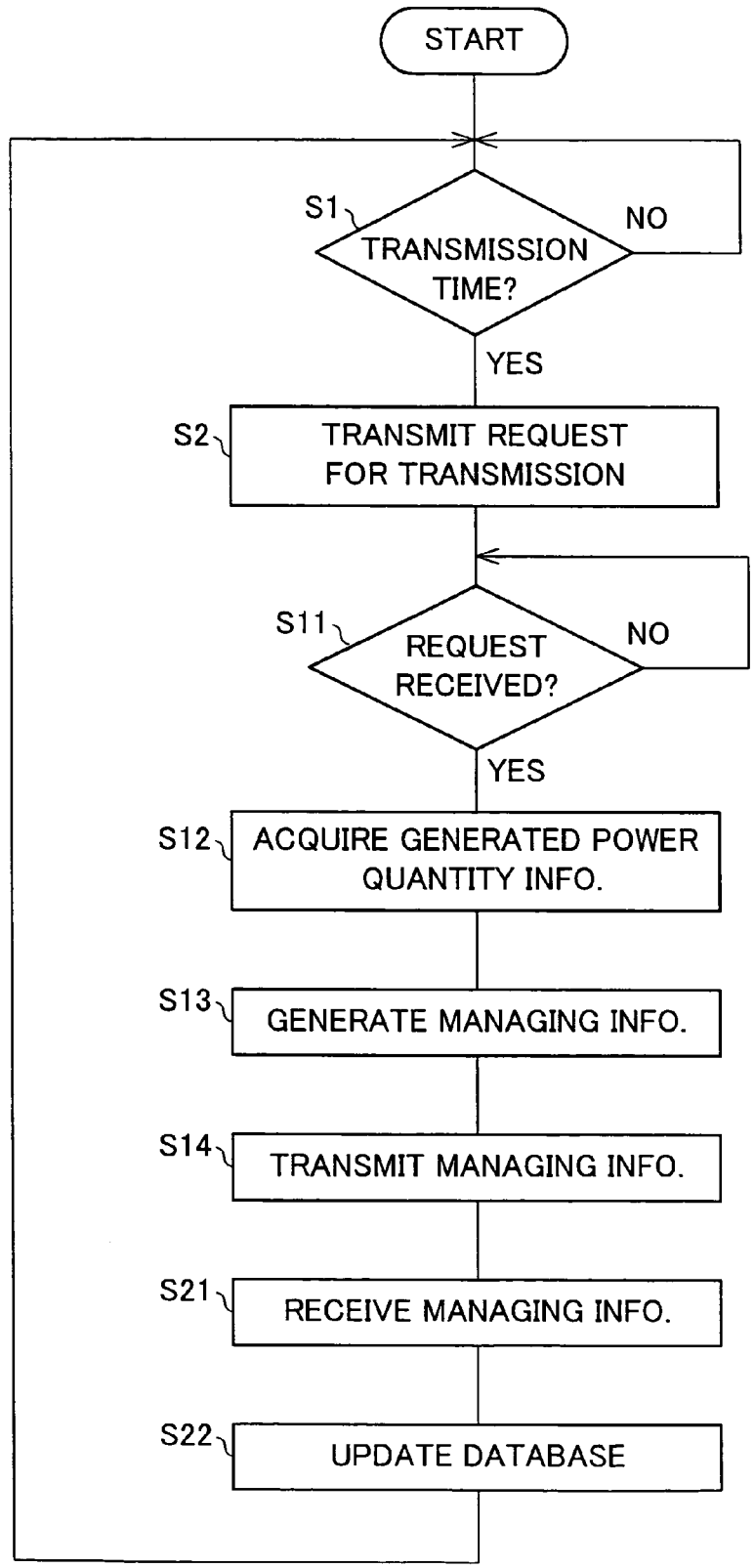
FIG. 5 is flow chart showing an operation of the managing system.

Now, assuming this arrangement, the following will in reference to FIG. 5 describe operation when generated power quantity information for a generator 2 is stored in the database 42 in the managing device 4. The timing controller 44 in the managing device 4 determines in step 1 ("S1") whether a time has come when a request for a transmission of generated power quantity information is to be transmitted to a generator 2 to be managed.

If having determined that a transmission request should be transmitted to a generator 2 (YES in S1), the timing controller 44 in S2 instructs the communications processing section 41 to transmit a request for a transmission of generated power quantity information to the generator 2.

Meanwhile, the generator 2 in S11 is standing by for a request for a transmission of generated power quantity information from the managing device 4. Upon the communications processing section 22 receiving a transmission request (YES in S11), the communications processing section 22 acquires a measured value from the watt-hour meter 23 as generated power quantity information (S12). Further, in S13, the communications device 22 generates management information including the generated power quantity information, identification information indicating the generator 2, location information for the generator 2, and weather information at the location of the generator 2. The device 22 then transmits the management information to the managing device 4 in S14.

In the managing device 4, upon the communications processing section 41 receiving the management information from the generator 2 (S21), the database manager 43 extracts the generated power quantity information for the generator 2, identification information, location information, and weather information from the management information. Further, the database manager 43 identifies a record for the generator 2 among the records in the database 42 on the basis of the identification information to update the record in accordance with the generated power quantity information, location information, and weather information (S22). Thus, the record contains the updated generated power quantity information history for the generator 2 which sent back the generated power quantity information in association with the weather information and location information.

S1 through S22 are carried out for each generator 2 to be managed by the managing device 4. Therefore, the database 42 in the managing device 4 contains generated power quantity information history for the individual generators 2 regardless of where the generators 2 are located.

In this arrangement, the generated power quantity information for the generators 2 is transmitted to the managing device 4 via the Internet 3. Thus, if the generators 2 can communicate with the managing device 4 via the Internet 3, the managing device 4 can store generated power quantity information for the generators 2 in association with the weather information and location information regardless of where the generators 2 are located.

Consequently, the user of the managing device 4 can, for example, monitor the database 42 through the database manager 43 to keep track of the generated power quantity information history for the generators 2 on the managing device 4 before receiving a report from a user of the generator 2.

Especially, since the database 42 of the managing system 1 in accordance with the present embodiment contains the location information and weather information at the location of the generator 2 in association with the generated power quantity information, the user of the managing device 4 can, for example, monitor the database 42 through the database manager 43 to estimate a causal relationship between weather information for the area and either the quantity of the power generated by the generator 2 or a breakdown/reduction in its power generation capability and verify the appropriateness of the estimate. In this manner, a quick feedback can be made to the design department of the generator 2, informing that a breakdown has occurred related to the weather, which enables a quick action to be taken to improve the quality of the generator 2.

Further, in the present embodiment, the determining section 45 in the managing device 14 determines whether the generator 2 is broken or otherwise suffering a reduction in power generation capability on the basis of the generated power quantity information stored in the database 42. In addition, the determining section 45, besides the determination based on the generated power quantity information, determines whether a generator 2 is broken or otherwise suffering a reduction in power generation capability by comparing the generated power quantity information for the generator 2 to the generated power quantity information for other generators 2 in the same area in accordance with the location information for the generators 2. In addition to the two determinations, the determining section 45 determines whether the generator 2 is broken or otherwise suffering a reduction in power generation capability by comparing the quantity of the power generated by the generator 2 as predicted from the weather information at the location of the generator 2 to the quantity of the power generated as indicated by the generated power quantity information actually transmitted.

Consequently, the determining section 45 can urge the user of the managing device 4 to make more thorough checks or do some maintenance work on the generator 2 determined to be broken or otherwise suffering a reduction in power generation capability. The user of the managing device 4 (for example, retail store and/or manufacturer of the generator 2) can take a quick action in the occurrence of a generator 2 breakdown and improves servicing for the generator 2.

Especially, with, for example, a contact address of the user of the generators 2 registered in the database 42, the user of the managing device 4 or a repairman notified by the user can inform the user of the generator 2 of a breakdown/repair for a better range of services without waiting for a report on the breakdown from the user of the generator 2.

Owing to the management of the generated power quantity information for the generator 2, the user of the managing device 4 can quickly learn of breakdowns which show a trend through statistic analysis of the generated power quantity information for the generator 2. Consequently, a quick feedback can be made to the design department of the generator 2, informing that a breakdown with a statistic trend has occurred, which enables a quick action to be taken to improve the quality of the generator 2.

If details of the breakdown can be reported, the generated power quantity information does not need to contain identification information. if a communications protocol is used which requires no header or footer to correctly send the generated power quantity information, the generated power quantity information does not need to contain a header or a footer.

If identification information is included as in the present embodiment, the broken generator 2 can be identified by the generated power quantity information. Therefore, by analyzing the generated power quantity information for the generators 2, the user of the managing device 4 can learn of, for example, a causal relationship between breakdowns and shipment lots of the generator 2. Consequently, manufacturing steps can be accurately and quickly improved, for example.

The generator 2 transmits its own generated power quantity information in response to a transmission request from the managing device 4. The timings at which the managing device 4 transmits a transmission request to the generators 2 is controlled so that the number of the generators 2 to which the communications processing section 41 is transmitting a transmission request do not exceed a predetermined value. Therefore, although the managing device 4 can collectively manage generated power quantity information for the generators 2, the managing device 4 can restrain a peak value of the quantity of incoming generated power quantity information, when compared with a case where the generators 2 transmit generated power quantity information at timings determined by the generators 2. Consequently, the generated power quantity information for the generators 2 at distant places can be collectively managed without placing too heavy workloads on the managing device 4.

As discussed in the foregoing, the workload on hardware resources of the managing device 4 is reduced; the managing device 4 does not have to be a dedicated device for the managing system 1. The managing device 4 can also serve other purposes, for example, as a server implementing other processes. Consequently, the managing system 1 for generators can be constructed at a reduced cost.

In the foregoing, the database 42 was presumed to store combinations of generated power quantity information, weather information, and location information. The database 42 can achieve similar effects by any storage method, provided that the database 42 can output such combinations. For example, if the location information does not change, the location information may be stored in association with the generators, not the generated power quantity information. If the managing device 4 can communicate with a weather information server so that the device 4 can forward a request that the server send back weather information at a location specified in the request, the database 42 may store combinations of location information, time, and weather information. In this case, the generator 2 transmits location information, generated power quantity information, and identification information as its management information. The managing device 4 obtains weather information according to the location information from the weather information server through a request, and registers the weather information in association with the location information and the time to the database 42. The managing device 4 may identify a generator 2 according to the identification information, and register combinations of the location information, generated power quantity information, and time for the generator 2 into the database 42 as time series. In this case, similar effects are again achieved because the database 42 can output associated generated power quantity information, weather information, and location information.

When the managing device 4 obtains weather information from a weather information server, not from the generator 2, as with the last case, the database 42 in the managing device 4 may store the locations of the generators 2 in advance, the communications processing section 41 may obtain weather information at the locations from the weather information server, and the timing controller 44 in the managing device 4 may determine from the weather information whether a time has come when a request for a transmission of generated power quantity information is to be transmitted to the generators 2. Hence, the generators 2 are prevented from transmitting generated power quantity information under such weather conditions that it is determined in advance that collecting generated power quantity information is unnecessary or unsuitable; generated power quantity information can be collected under weather conditions predetermined to be relatively suitable according to an accurate decision/knowledge as to whether the generator 2 is generating power at its specified full capacity.

More concretely, for example, the timing controller 44 may transmit a request for a transmission of generated power quantity information to the generator 2 upon a change of the weather information at the location of the generator 2 from "cloudy" to "clear sky or fine." Alternatively, the timing controller 44 may transmit a request for a transmission of generated power quantity information to the generator 2 when the weather information at the location is "clear sky or fine" and the sun reaches the highest position above the generator 2. Either way, the managing device 4 requests to the generators 2 to transmit a generated power quantity when it is fine in order to register generated power quantity information indicating the generated power quantity in the database 42. Therefore, the managing device 4 can accurately determine/learn of whether the generator 2 is generating power at its specified full capacity.

Note also that in the foregoing, the determining section 45 was presumed to determine whether the generator 2 is broken by means of three methods as an example. Only one of the methods may be used in the determination. When this is the case, the generator 2 does not need to transmit unnecessary information in the determination (e.g., weather information and location information). Neither does the managing device 4 need to store the information in the database 42.

[Embodiment 2]

In embodiment 1, the members constituting the generator 2 formed a single physical entity. There are other choices. For example, as shown in FIG. 6, a member realizing the inherent function of an electric power generator (e.g., the generator section 21) and another member transmitting generated power quantity information (e.g., the communications processing section 22 and the watt-hour meter 23) may be formed separately with the former (generator main body) and the latter (communications device) linked by a wired or wireless-communications path.

Figure 6:
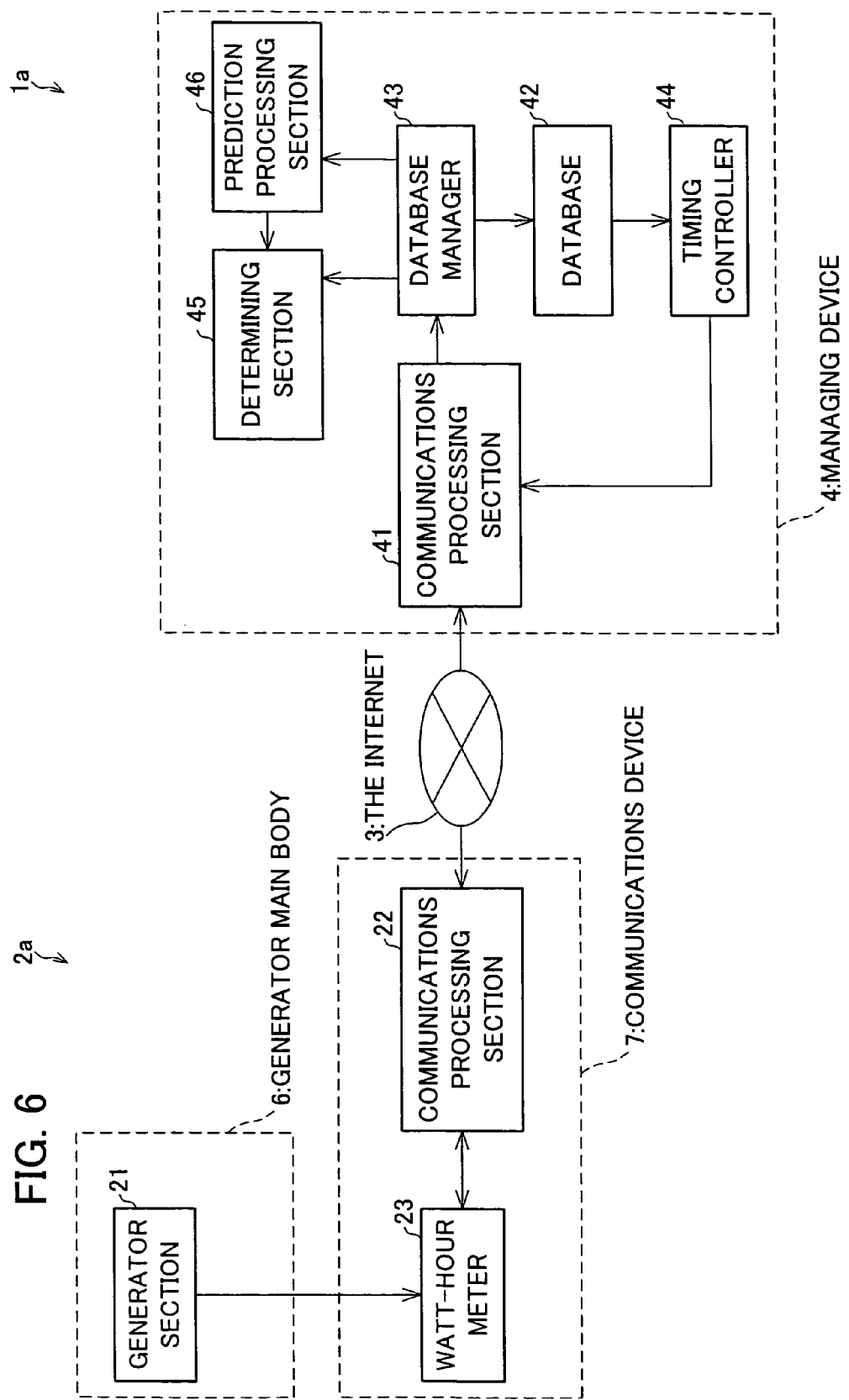
FIG. 6, illustrating another embodiment of the present invention, is a block diagram showing major features of a system for managing electric power generators.

FIG. 6 shows an example where the FIG. 1 arrangement is divided. With an generator main body 6 including a generator section 21 being linked to a communications device 7 including a communications processing section 22 and a watt-hour meter 23, the main body 6 and the section 21 operate as a similar generator 2*a* to the generator 2 in FIG. 1.

In this case, if there is no need to connect to the Internet 3, the generator main body 6 is used alone. Only when there is a need to connect to the Internet 3 should the communications device 7 be added. Thereby, the generator main body 6 can be used both when there is a need to connect to the Internet 3 and when there is not.

In the embodiments, the generated power quantity information transmitted by the generator (2, 2*a*) of the managing system (1, 1*a*) was presumed to contain identification information for the generator as an example. There are other choices. Certain effects are achieved provided that the generated power quantity information for the generator contains information indicating details of a breakdown.

When the generated power quantity information contains identification information for the generator as in the embodiments, a set of generators of the same type can be managed simultaneously. Especially, in the managing system in accordance with the present embodiment, as mentioned earlier, by including a model code and a serial code in identification information, the managing device (4) can identify the models and serial numbers of the generators on the basis of generated power quantity information. Further, the identification information transmitted from the generator in accordance with the present embodiment contains identification information for each module. The database manager (43) in the managing device stores the identification information in the database (42). Therefore, the managing device is capable of managing the generators on a module-to-module basis.

In the embodiments, the generator section (21) in the generator was constituted by a set of modules, the watt-hour meter (23) measured the electric power generated by each of the modules, and the communications processing section (22) transmitted management information including generated power quantity information for the individual modules to the managing device 4 as an example. This is however not the only choice.

The communications processing section may transmit as generated power quantity information management information containing only the generated power quantity for the entire generator section when the generator section is constituted by a set of modules. However, if the generated power quantity is measured for each module, and the management information transmitted contains the generated power quantities for the individual modules as in the present embodiment, when a certain generator has decreased its power generation, a module causing the reduction of the generated power quantity can be identified among the modules in that generator.

In the embodiments, the managing device was presumed to include the determining section (45) and the prediction processing section (46) to determine whether each generator is broken or otherwise suffering a reduction in power generation capability. This is not the only choice. Provided with the communications processing section (41), the database manager (43), and the timing controller (44), the managing device can collect and store, into the database, data according which a decision is made as to the occurrence of a breakdown and other trouble for each generator, without experiencing too heavy workloads; certain effects are therefore achieved. However, if the determining section and the prediction processing section are also included as in the present embodiment, the workload of the user of the managing device 4 is reduced, because the user of the managing device does not need to check thoroughly or do any maintenance work on the generator determined by these members as experiencing no breakdown or other trouble.

As in the foregoing, a method of managing electric power generators in accordance with the present invention includes:

the request step of a managing device transmitting, via the Internet to either an electric power generator to be managed or an electric-power-generator-end communications device connected to an electric power generator to be managed, a request for a transmission of generated power quantity information for the electric power generator;

the reply step of either the electric power generator or the communications device transmitting the generated power quantity information indicating a generated power quantity for the electric power generator back to the managing device in response to the request;

the storage step of the managing device storing the generated power quantity information into a database in association with the electric power generator which transmitted back the generated power quantity information or the electric power generator to which is connected the communications device which transmitted back the generated power quantity information; and the decision step of the managing device deciding a timing to transmit a request for a transmission of generated power quantity information for the electric power generators.

According to the arrangement, in the reply step, the generated power quantity information for the electric power generator is transmitted to the managing device over the Internet. Thus, if the electric power generators or the communications equipment is capable of communicating with the managing device over the Internet, the managing device can store the generated power quantity information for the electric power generators into a database wherever the electric power generators are located. Therefore, the managing device or the user of the managing device can determine from the generated power quantity information stored in the database whether any one of the electric power generators is broken or suffering a reduction in power generation capability. An action can be taken more quickly than in a case where the breakdown and other trouble of the electric power generator is not dealt with until the user of the electric power generator reports the trouble.

Further, the generated power quantity information for the electric power generators is transmitted in response to a request for a transmission from the managing device, and the managing device decides timings of the transmissions of requests for transmissions of the generated power quantity information from the electric power generators; therefore, the managing device can control on its own the peak data quantity of the generated power quantity information it receives. Therefore, the managing device is capable of collectively managing the generated power quantity information for the electric power generators, and still restrains the data peak quantity in comparison with a case where the electric power generators transmit generated power quantity information at timings determined on their own. Consequently, the generated power quantity information for the generators can be collectively managed without placing too heavy workloads on the managing device. This reduces the workload on hardware resources of the managing device and enables the system for managing electric power generators to be constructed at a reduced cost.

The managing device may set the transmission timings for the convenience of the managing device itself. The managing device may transmit transmission requests to target electric power generators when its management capacity is not fully used for the other purposes. In addition, the managing device can freely select the electric power generator to be managed through the transmission or no transmission of a transmission request. Therefore, management targets can be changed in accordance with a time zone (e.g., daytime or nighttime) by the managing device learning of the identification information for the electric power generators to be managed and identifying the management targets for any particular time period with reference to the identification information. As discussed in the foregoing, a greater number of electric power generators can be managed at once by the managing device changing target electric power generators for management in accordance with a time zone and other conditions.

More specifically, for example, the target electric power generators can be changed every hour so that the managing device manages generated power quantities for solar cells in Japan in the daytime hours, Japan time and, at night, generated power quantities for those in, for example, Europe, the U.S., and other regions where it is the daytime. In this case, the managing device can monitor generated power quantities when the electric power generators are producing power (i.e., daytime), which speeds up the discovery of a breakdown.

In addition to the arrangement, the determining step may be further included of the managing device determining whether the electric power generator corresponding to the generated power quantity information stored in the storage step is broken or suffering a reduction in power generation capability on the basis of the generated power quantity information.

According to the arrangement, the managing device determines from the generated power quantity information stored in the storage step whether the electric power generator corresponding to the generated power quantity information is broken or experiencing any other trouble. This reduces the workload of the user when compared with the user of the managing device checks the generated power quantity information for all the electric power generators to be managed to determine whether there is any breakdown or other trouble.

Further, when the electric power generators are solar cells, in addition to the arrangement, the storage step may include the weather information storage step of obtaining weather information indicating weather at a location of the electric power generator to store the weather information into the database, together with the generated power quantity information for the electric power generator. In addition to the arrangement, the weather information obtaining step may include the step of obtaining location information for the electric power generator to be managed indicating a location of the electric power generator, and the step of requesting weather information at the location with a weather information server transmitting back the weather information at the requested location to obtain weather information at the location.

In addition to the arrangement, the communications device or the electric power generator may in the reply step transmits back weather information at a location of the electric power generator together with the generated power quantity information, and the managing device may in the weather information storage step store the weather information transmitted back.

According to these arrangements, for example, weather information is obtained by retrieving location information for the electric power generator stored in advance, followed by a request for weather information at the location with a weather information server transmitting back the weather information at the requested location or receipt of the weather information from the electric power generator or the communications device, so that the weather information is stored into a database together with the generated power quantity information for the electric power generator.

Under such circumstances, if the electric power generator is a solar cell, the generated power quantity for the electric power generator is strongly affected by the weather. The generated power quantity for the electric power generator may greatly vary depending on the intensity of sunlight even when the power generation capacity of the electric power generator remains unchanged. Therefore, when the generated power quantity has fallen, possible factors include not only a breakdown or a reduction in power generation capability of the electric power generator, but also low intensity of sunlight due to poor weather.

However, according to the previous arrangements, the weather information at the location of the electric power generator is stored in the database together with the generated power quantity information for the electric power generator. Therefore, the managing device or the user of the managing device can exclude, from the electric power generators generating a reduced quantity of power, those which are affected poor weather. Consequently, those electric power generators which are suspected of a breakdown or a reduction in power generation capability can be more accurately identified.

In addition to the arrangement, the method may further include the prediction step of the managing device predicting a generated power quantity for the electric power generator corresponding to the weather information stored in the storage step on the basis of the weather information.

According to the arrangement, the managing device predicts a generated power quantity for the electric power generator corresponding to the weather information stored in the storage step on the basis of the weather information; therefore, the user workload in determining an occurrence of a breakdown and other trouble can be reduced compared to a case where the user of the managing device checks the generated power quantity information and the weather information for all the electric power generators to be managed, predicts the generated power quantity for all the electric power generators, and compares the predicted and measured values, and determines whether the electric power generator is broken or experiencing any other trouble.

The method may further include the determining step of the managing device determining whether the electric power generator corresponding to the generated power quantity information stored in the storage step is broken or suffering a reduction in power generation capability on the basis of the generated power quantity information and the generated power quantity as predicted in the prediction step.

According to the arrangement, the managing device determines whether the electric power generator corresponding to the generated power quantity information stored in the storage step is broken or suffering a reduction in power generation capability on the basis of the generated power quantity information and the generated power quantity as predicted in the prediction step; the user workload of the managing device is further reduced.

Further, when the electric power generator is a solar cell, in addition to the arrangement, the method may further include:

the grouping step of the managing device obtaining location information indicating locations of electric power generators to be managed to divide the electric power generators into groups according to the location information, each group consisting of those generators located at the same location; and the determining step of the managing device comparing the generated power quantity information, stored in the storage step, for those electric power generators divided into the same group in the grouping step to determine whether any of the electric power generators is broken or suffering a reduction in power generation capability.

Under such circumstances, if the electric power generator is a solar cell, as mentioned earlier, the generated power quantity is variable according to the intensity of sun light. The changes in generated power quantity of the solar cells located close to each other often show the same trend. Meanwhile, according to the arrangement, the managing device divides the electric power generators into groups according to the location information of the electric power generator, each group consisting of those generators located at the same location, and compares the generated power quantity information for those electric power generators divided into the same group in order to determine whether any of the electric power generators is broken or experiencing any other trouble. Therefore, from the electric power generators generating a reduced quantity of power, can be excluded those of the same group which are showing similar changes in generated power quantity, in other words, those generating a reduced quantity of power presumably due to poor weather, not because they are broken or otherwise suffering a reduction in power generation capability. Consequently, those electric power generators suspected of a breakdown or a reduction in power generation capability can be more accurately identified.

Incidentally, the location information of the electric power generators may be store into a database in the managing device in advance. The communications device or the electric power generator may however transmit back the location information indicating the location of the electric power generators in the reply step together with the generated power quantity information.

According to the arrangement, the location information and the generated power quantity information are both transmitted from the communications device or the electric power generator. The managing device obtains location information via message from the communications device or the electric power generator. Therefore, similarly to the previous arrangements, those electric power generators suspected of a breakdown or a reduction in power generation capability can be more accurately identified.

Besides, the location information is transmitted from the communications device or the electric power generator; therefore, after the location of the communications device or the electric power generator is changed, and the location information as stored in the communications device or the electric power generator is changed, the location information obtained by the managing device in the weather information obtaining step or the determining step is changed without changing the content of the database in the managing device. Therefore, the location information stored in the communications device or the electric power generator always matches the location information stored in the database in the managing device. Consequently, no wrong weather information due to a non-matching is obtained, and wrong decision is prevented.

In addition to the arrangement, in the reply step, the communications device or the electric power generator may transmit back identification information by which the electric power generator corresponding to generated power quantity information is identified, together with the generated power quantity information.

According to the arrangement, those electric power generators generating no power at all or a drastically reduced quantity of power are identified according to the identification information transmitted with the generated power quantity information. Therefore, the relationship between the generated power quantity information for the electric power generators and each electric power generator can be analyzed. Consequently, the user of the managing device can, for example, learn of a causal relationship between breakdowns or reduction in power generating capability and shipment lots of the electric power generators. Consequently, manufacturing steps can be accurately and quickly improved, for example.

In addition to the arrangement, the generated power quantity information may include generated power quantity information for individual modules constituting the electric power generator.

According to the arrangement, the generated power quantity information in the database is stored individually for each electric power generator module. Therefore, the determination as to an occurrence of a breakdown and a reduction in power generating capability can be made on a module-to-module basis. Broken parts are more accurately identified in the electric power generator.

A managing device (4) in accordance with the present invention, as in the foregoing, includes:

transmission request means (41) for transmitting, via the Internet (3) to either an electric power generator (2) to be managed or an electric-power-generator-end communications device (7) connected to an electric power generator (6), a request for a transmission of generated power quantity information for the electric power generator;

registering means (43) for registering the generated power quantity information into a database in association with the electric power generator or the communications device upon transmitting the generated power quantity information back from the electric power generator or the communications device; and timing decision means (44) for deciding a timing for the transmission request means to transmit the request. In addition, a computer program in accordance with the present invention is a computer program causing a computer to operate as these individual means. By executing the computer program, the computer operates as the managing device.

According to the arrangement, the transmission request means transmits a request for a transmission of generated power quantity information to the communications device or the electric power generator at a transmission timing decided by the timing decision means. The registering means associates the generated power quantity information transmitted back from the communications device or electric power generator to the communications device or electric power generator, and registers the generated power quantity information into the database in association with that communications device or electric power generator. Therefore, the managing device is capable of controlling the peak data quantity of the generated power quantity information it receives. Thus, the managing device is capable of collectively managing the generated power quantity information for the electric power generators, and still restrains the data peak quantity in comparison with a case where the electric power generators transmit generated power quantity information at timings determined on their own. Consequently, the generated power quantity information for the generators can be collectively managed without placing too heavy workloads on the managing device. This reduces the workload on hardware resources of the managing device and enables the system for managing electric power generators to be constructed at a reduced cost.

An electric power generator (2, 2a) in accordance with the present invention, as in the foregoing, includes:

receiving means (22) for receiving a request for a transmission addressed to the electric power generator via the Internet (3) from a managing device (4) having timing decision means (44) for deciding timings to transmit a request for a transmission of generated power quantity information for electric power generators to be managed; and reply means (22) for transmitting generated power quantity information indicating a generated power quantity for the electric power generator back to the managing device in response to the request. A computer program in accordance with the present invention is a computer program causing a computer provided to an electric power generator to operate as these individual means. By executing the computer program, the electric power generator including the computer operates as the foregoing electric power generator.

A communications device (7) in accordance with the present invention, as in the foregoing, is a communications device connectable to an electric power generator (6), and includes:

receiving means (22) for receiving a request for a transmission addressed to the communications device via the Internet (3) from a managing device (4) having timing decision means (44) for deciding timings to transmit a request for a transmission of generated power quantity information for electric power generators to be managed; and reply means (22) for transmitting generated power quantity information indicating a generated power quantity for the electric power generator connected to the communications device back to the managing device in response to the request. A computer program in accordance with the present invention is a computer program causing a computer to operate as these individual means. By executing the computer program, the computer operates as the communications device.

According to these arrangements, the generated power quantity information for the electric power generators is again transmitted in response to a request for a transmission from the managing device, similarly to the foregoing method of managing electric power generators, Besides, the managing device decides the timing to transmit a request for a transmission of generated power quantity information for the electric power generators; therefore, the managing device is capable of controlling the peak data quantity of the generated power quantity information it receives. Thus, the managing device is capable of collectively managing the generated power quantity information for the electric power generators, and still restrains the data peak quantity in comparison with a case where the electric power generators transmit generated power quantity information at timings determined on their own. Consequently, the managing device can collectively manage the generated power quantity information for the electric power generators without experiencing too heavy workloads, enabling the user of the managing device to more quickly deal with a breakdown and other trouble.

In addition to the arrangement, the receiving means and the reply means may be connected to the Internet via a power line (24) transmitting electric power generated by the electric power generator. According to the arrangement, connecting the power line transmitting electric power generated by the electric power generator can also establish a connection for communications over the Internet. Therefore, the electric power generator can be connected to the Internet without the user actively knowing the communication line. Also, the managing device can manage each and every one of the generators it is supposed to manage.

A system for managing electric power generators in accordance with the present invention, as in the foregoing, includes the managing device and the electric power generator or the electric-power-generator-end communications device.

According to the arrangement, the generated power quantity information for the electric power generators is again transmitted in response to a transmission request from the managing device similarly to the method of managing electric power generators. Besides, the managing device decides timings to transmit a request for a transmission of generated power quantity information for the electric power generators; therefore, the managing device is capable of controlling the peak data quantity of the generated power quantity information it receives. Thus, the managing device is capable of collectively managing the generated power quantity information for the electric power generators, and still restrains the data peak quantity in comparison with a case where the electric power generators transmit generated power quantity information at timings determined on their own. Consequently, the managing device can collectively manage the generated power quantity information for the electric power generators without experiencing too heavy workloads, enabling the user of the managing device to more quickly deal with a breakdown and other trouble.

In addition to the arrangement, the receiving means and the reply means may be connected to the Internet via a power line (24) transmitting electric power generated by the electric power generator. According to the arrangement, connecting the power line transmitting electric power generated by the electric power generator can also establish a connection for communications over the Internet. Therefore, the electric power generator can be connected to the Internet without the user actively knowing the communication line. Also, the managing device can manage each and every one of the generators it is supposed to manage.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A method of managing electric power generators, comprising the steps of:
   (a) a managing device transmitting, via the Internet to either an electric power generator to be managed or an electric-power-generator-end communications device connected to an electric power generator to be managed, a request for a transmission of generated power quantity information for the electric power generator, the generated power quantity information being an information indicative of a power quantity which has been generated in the electric power generator;
   (b) either the electric power generator or the communications device transmitting the generated power quantity information indicating a generated power quantity for the electric power generator back to the managing device in response to the request;

(c) the managing device storing the generated power quantity information into a database in association with the electric power generator which transmitted back the generated power quantity information or the electric power generator to which is connected the communications device which transmitted back the generated power quantity information; and (d) the managing device deciding a timing to transmit a request for a transmission of generated power quantity information for the electric power generators so that timings of transmitting the generated power quantity informations disperse to avoid crowdedness of communication due to transmission of the generated power quantity information from the plural electric power generators, wherein the managing device delays transmission of the request for transmission of the generated power quantity information if workload due to the request exceeds a predetermined value.

2. The method of claim 1, further comprising the step of (e) the managing device determining whether the electric power generator corresponding to the generated power quantity information stored in step (c) is broken or suffering a reduction in power generation capability on the basis of the generated power quantity information.

3. The method of claim 1, wherein:
the electric power generator is a solar cell; and
step (c) includes the step of (f) obtaining weather information indicating weather at a location of the electric power generator to store the weather information into the database, together with the generated power quantity information for the electric power generator.

4. The method of claim 3, wherein:
in step (b), the electric power generator or the communications device transmits back weather information at a location of the electric power generator together with the generated power quantity information; and
in step (f), the managing device stores the weather information transmitted back.

5. The method of claim 3, further comprising the step of (g) the managing device predicting a generated power quantity for the electric power generator corresponding to the weather information stored in step (c) on the basis of the weather information.

6. The method of claim 5, further comprising the step of (h) the managing device determining whether the electric power generator corresponding to the generated power quantity information stored in step (c) is broken or suffering a reduction in power generation capability on the basis of the generated power quantity information and the generated power quantity as predicted in step (g).

7. The method of claim 1, wherein the electric power generator is a solar cell,
the method further comprising the steps of:
(i) the managing device obtaining location information indicating locations of electric power generators to be managed to divide the electric power generators into groups according the location information, each group consisting of those generators located at the same location; and
(j) the managing device comparing the generated power quantity information, stored in step (c), for those electric power generators divided into the same group in step (i) in order to determine whether any of the electric power generators is broken or suffering a reduction in power generation capability.

8. The method of claim 7, wherein in step (b), the electric power generator or the communications device transmits back location information at a location of the electric power generator together with the generated power quantity information.

9. The method of claim 1, wherein in step (b), the electric power generator or the communications device transmits back identification information by which the electric power generator corresponding to generated power quantity information is identified, together with the generated power quantity information.

10. The method of claim 1, wherein the generated power quantity information includes generated power quantity information for individual modules constituting the electric power generator.

11. The method of claim 1, wherein the managing device transmits one request for a transmission of generated power quantity information to a predetermined number of one group of the electric power generators and waits for a predetermined period of time before transmitting another request for a transmission of generated power quantity information to a predetermined number of another group of the electric power generators so that the number of the electric power generators which receive the request for transmission of the generated power quantity information does not exceed a predetermined value.

12. A computer program causing a computer to operate as a managing device for electric power generators, the computer program causing the computer to execute the steps of:
(k) transmitting, via the Internet to either an electric power generator to be managed or an electric-power-generator-end communications device connected to an electric power generator to be managed, a request for a transmission of generated power quantity information for the electric power generator, the generated power quantity information being an information indicative of a power quantity which has been generated in the electric power generator;
(l) registering the generated power quantity information into a database in association with the electric power generator or the communications device upon transmitting the generated power quantity information back from the electric power generator or the communications device;
(m) deciding a timing to transmit a request for a transmission in step (k) so that timings of transmitting the generated power quantity informations disperse to avoid crowdedness of communication due to transmission of the generated power quantity information from the plural electric power generators,
wherein the managing device delays transmission of the request for transmission of the generated power quantity information if workload due to the request exceeds a predetermined value.

13. The method of claim 12, wherein the managing device transmits one request for a transmission of generated power quantity information to a predetermined number of one group of the electric power generators and waits for a predetermined period of time before transmitting another request for a transmission of generated power quantity information to a predetermined number of another group of the electric power generators so that the number of the electric power generators which receive the request for transmission of the generated power quantity information does not exceed a predetermined value.

14. A computer program causing a computer in an electric power generator to execute the steps of:

(o) receiving a request for a transmission addressed to the electric power generator via the Internet from a managing device having timing decision means for deciding timings to transmit a request for a transmission of generated power quantity information for electric power generators to be managed so that timings of transmitting the generated power quantity information disperse to avoid crowdedness of communication due to transmission of the generated power quantity information from the plural electric power generators; and (p) transmitting generated power quantity information indicating a generated power quantity which has been generated in the electric power generator back to the managing device in response to the requests, wherein the managing device delays transmission of the request for transmission of the generated power quantity information if workload due to the request exceeds a predetermined value.

15. The method of claim 14, wherein the managing device transmits one request for a transmission of generated power quantity information to a predetermined number of one group of the electric power generators and waits for a predetermined period of time before transmitting another request for a transmission of generated power quantity information to a predetermined number of another group of the electric power generators so that the number of the electric power generators which receive the request for transmission of the generated power quantity information does not exceed a predetermined value.

16. A computer program causing a computer connectable to an electric power generator to operate as a communications device, the computer program causing the computer to execute the steps of:

(q) receiving a request for a transmission addressed to the communications device via the Internet from a managing device having timing decision means for deciding timings to transmit a request for a transmission of generated power quantity information for electric power generators to be managed so that timings of transmitting the generated power quantity informations disperse to avoid crowdedness of communication due to transmission of the generated power quantity information from the plural electric power generators; and (r) transmitting generated power quantity information indicating a generated power quantity which has been generated in the electric power generator connected to the communications device back to the managing device in response to the request, wherein the managing device delays transmission of the request for transmission of the generated power quantity information if workload due to the request exceeds a predetermined value.

17. The method of claim 16, wherein the managing device transmits one request for a transmission of generated power quantity information to a predetermined number of one group of the electric power generators and waits for a predetermined period of time before transmitting another request for a transmission of generated power quantity information to a predetermined number of another group of the electric power generators so that the number of the electric power generators which receive the request for transmission of the generated power quantity information does not exceed a predetermined value.

18. A method of managing electric power generators, comprising the steps of:

(a) a managing device transmitting, via the Internet to either an electric power generator to be managed or an electric-power-generator-end communications device connected to an electric power generator to be managed, a request for a transmission of generated power quantity information for the electric power generator, the generated power quantity information being an information indicative of a power quantity which has been generated in the electric power generator;

(b) either the electric power generator or the communications device transmitting the generated power quantity information indicating a generated power quantity for the electric power generator back to the managing device in response to the request;

(c) the managing device storing the generated power quantity information into a database in association with the electric power generator which transmitted back the generated power quantity information or the electric power generator to which is connected the communications device which transmitted back the generated power quantity information; and (d) the managing device deciding a timing to transmit a request for a transmission of generated power quantity information for the electric power generators so that timings of transmitting the generated power quantity informations disperse to avoid crowdedness of communication due to transmission of the generated power quantity information from the plural electric power generators, wherein the managing device transmits the request for transmission of the generated power quantity information with avoiding a time period specified in advance as heavy workload due to the request exceeds a predetermined value.

19. A computer program causing a computer to operate as a managing device for electric power generators, the computer program causing the computer to execute the steps of:

(k) transmitting, via the Internet to either an electric power generator to be managed or an electric-power-generator-end communications device connected to an electric power generator to be managed, a request for a transmission of generated power quantity information for the electric power generator, the generated power quantity information being an information indicative of a power quantity which has been generated in the electric power generator;

(l) registering the generated power quantity information into a database in association with the electric power generator or the communications device upon transmitting the generated power quantity information back from the electric power generator or the communications device;

(m) deciding a timing to transmit a request for a transmission in step (k) so that timings of transmitting the generated power quantity informations disperse to avoid crowdedness of communication due to transmission of the generated power quantity information from the plural electric power generators, wherein the managing device transmits the request for transmission of the generated power quantity information with avoiding a time period specified in advance as heavy workload due to the request exceeds a predetermined value.

20. A computer program causing a computer in an electric power generator to execute the steps of:

(o) receiving a request for a transmission addressed to the electric power generator via the Internet from a managing device having timing decision means for deciding timings to transmit a request for a transmission of generated power quantity information for electric power generators to be managed so that timings of transmitting the generated power quantity information disperse to avoid crowdedness of communication due to transmission of the generated power quantity information from the plural electric power generators; and (p) transmitting generated power quantity information indicating a generated power quantity which has been generated in the electric power generator back to the managing device in response to the request, wherein the managing device transmits the request for transmission of the generated power quantity information with avoiding a time period specified in advance as heavy workload due to the request exceeds a predetermined value.

21. A computer program causing a computer connectable to an electric power generator to operate as a communications device, the computer program causing the computer to execute the steps of:

(q) receiving a request for a transmission addressed to the communications device via the Internet from a managing device having timing decision means for deciding timings to transmit a request for a transmission of generated power quantity information for electric power generators to be managed so that timings of transmitting the generated power quantity informations disperse to avoid crowdedness of communication due to transmission of the generated power quantity information from the plural electric power generators; and (r) transmitting generated power quantity information indicating a generated power quantity which has been generated in the electric power generator connected to the communications device back to the managing device in response to the request, wherein the managing device transmits the request for transmission of the generated power quantity information with avoiding a time period specified in advance as heavy workload due to the request exceeds a predetermined value.

* * * * *